Figure 5:
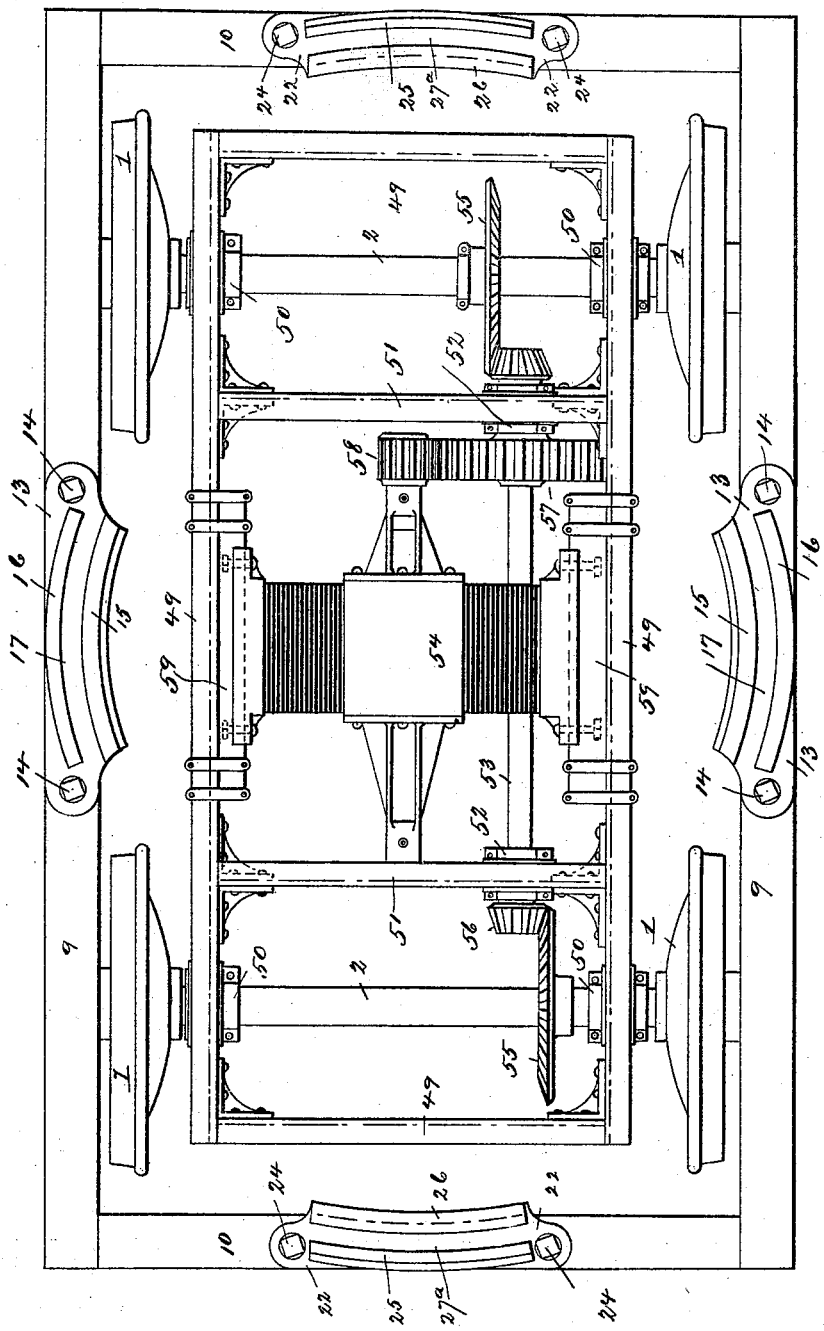

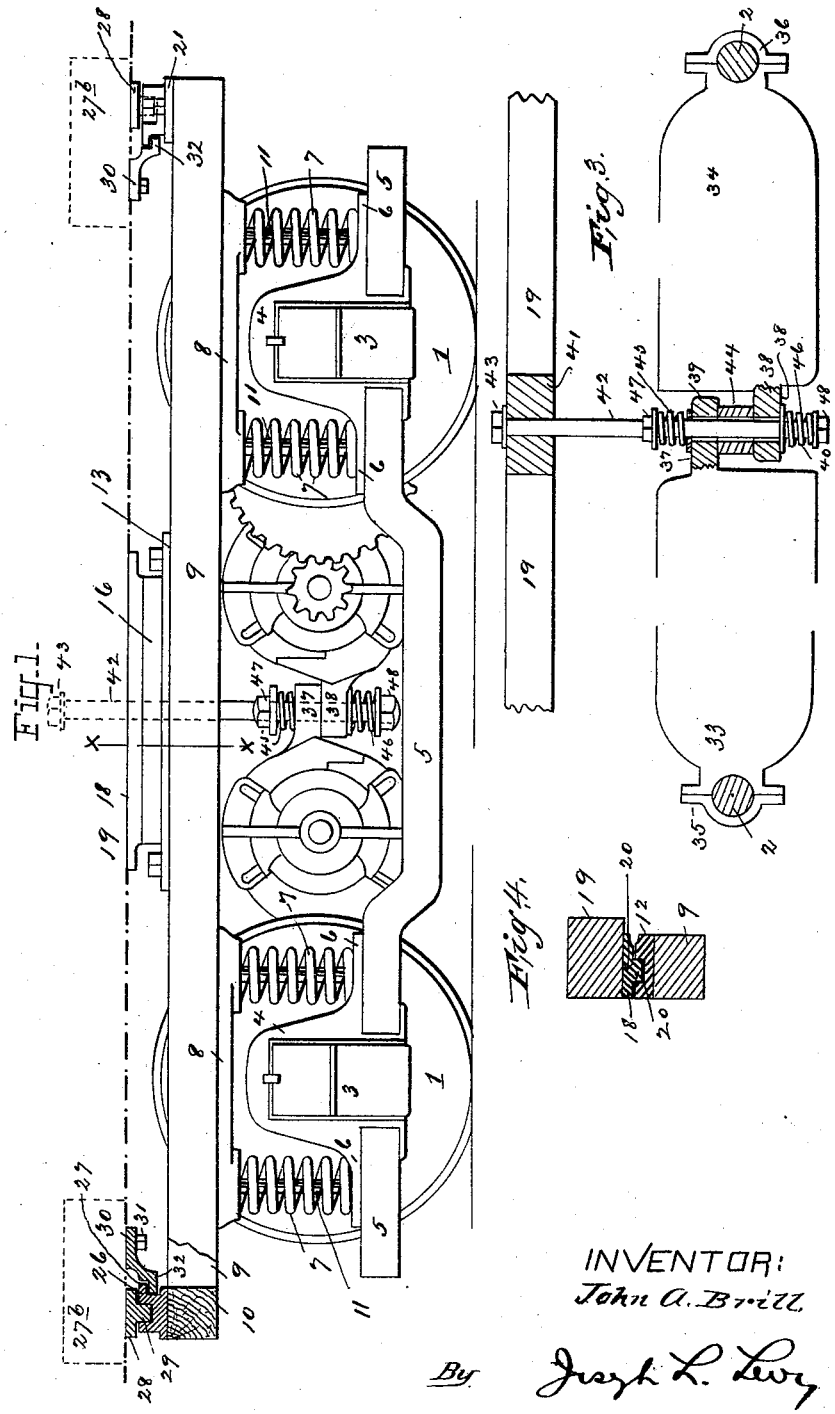

(No Model.) 3 Sheets—Sheet 2.
J. A. BRILL.
MOTOR TRUCK.
No. 507,208. Patented Oct. 24, 1893.
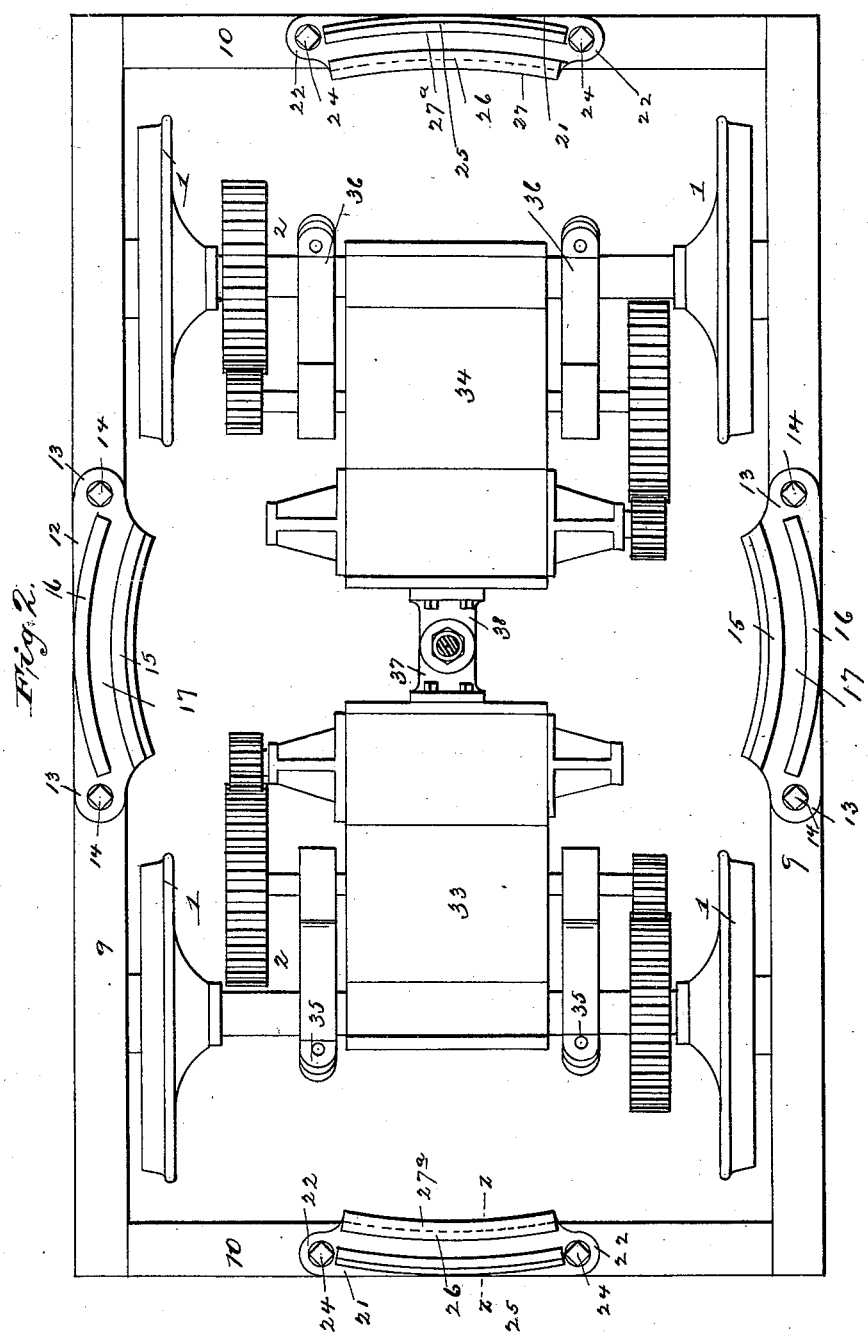
ATTEST:
INVENTOR:
John A. Brill.
By Joseph L. Levy
Attorney (No Model.) 3 Sheets—Sheet 3.
J. A. BRILL.
MOTOR TRUCK.

No. 507,208. Patented Oct. 24, 1893.

Attest:
C. W. Benjamin
H. F. Dunhus

Inventor
John A. Brill
by Joseph L. Levy
atty.

UNITED STATES PATENT OFFICE.

JOHN A. BRILL, OF PHILADELPHIA, PENNSYLVANIA.

MOTOR-TRUCK.

SPECIFICATION forming part of Letters Patent No. 507,208, dated October 24, 1893.

Application filed March 25, 1893. Serial No. 467,594. (No model.)

*To all whom it may concern:*

Be it known that I, JOHN A. BRILL, a citizen of the United States, residing at Philadelphia, in the county of Philadelphia and State of Pennsylvania, have made certain new and useful Improvements in Motor-Trucks, of which the following is a specification.

My invention relates to pivotal trucks of the class wherein one or more motors are secured upon a convenient portion of a truck frame for the purpose of propelling the truck, the special use of such truck being two under one car at each end thereof.

My present invention has for its object to provide a clear and untrammeled space between the axles and side frames of the truck for the location and operation of the propelling motor, and to so support the motor that supports from the truck are dispensed with, the whole object being to permit of the handling of the motor for repairs or equipment without making it necessary to dismantle a portion of the truck.

The first part of my invention, to wit, the clear and open space, is obtained by locating side bearings on the side frame of the truck at any desired point and car rub plates above them, the side bearings being designed to take the weight of the car body and acting as resting points or bearings for the car on the truck, the rub plates and side bearings not being designed as the sole pivotal connection for the car and truck, such pivotal connection being made by the side bearings and the segmental pivot plates at each end of the truck frame, the end pivot plates acting in the double capacity of assisting in pivotally uniting the car and truck and serving also as a means for drawing the truck when the motive power is applied to the car, and for drawing the car when the motive power is applied to the truck. In this part of my invention is embraced the combination of an open center truck and a frame for carrying the motor within and by itself, with the means for securing a pivotal connection of the car and truck, such means securing the free and open center.

The second part of my invention relates to the special method of hanging or supporting the motor so that the same can be dismantled or the truck equipped therewith, expeditiously, without involving in such operation the dismantling of any portion of the truck, such improvement embodying a pendant from the car body located in the pivotal center of the truck, (which in this case is not a mechanical center, but a point about which the truck and car move in relation to each other) so that the car and truck can move or swivel one in relation to the other, without affecting the support of the motor on the truck. This improvement permits of the use of one or more motors, the free end or ends or nose pieces of which extend toward each other and meet substantially about the pivotal center of the truck and car, so that one support from the car body can be made to suspend two motors. My invention also comprises the details of structure hereinafter described and further pointed out in the claims.

In the drawings accompanying this specification—Figure 1 is a side elevation (partly in section on the line $z\ z$, Fig. 2) of a truck embodying the features of my invention showing motors attached and a car body indicated by dotted lines; Fig. 2, a plan view thereof, with the car body removed; Fig. 3, a side elevation, enlarged, of a portion of the car body and two motors suspended from the car body and sleeved on the axle, the axles and one of the cross sills being in sections; Fig. 4, a sectional elevation on the line $x\ x$, Fig. 1; Fig. 5, a plan view of the truck and independent motor frame.

Like numerals of reference refer to like parts throughout the several views.

I shall first describe a truck of the usual or ordinary construction and then the application of my invention thereto.

1 are the truck wheels, and 2 the axles having bearings in axle boxes 3, over which lie yokes 4, to which yokes are secured side bars 5 of what are known in the art as an axle box frame, the side bars being secured to ears 6 of the yokes, upon which ears rest the car springs 7 which bear against at the top spring plates 8 which are secured in any desirable manner to the side bars 9 of the top chord, the side bars being united by the cross bars 10.

The side bars of the axle box frame depend from the axle boxes, from which it derives its name, and may be rigidly or flexibly supported thereon, which side bars may also be united laterally, which union is preferably made between the ends of the side beams outside of the wheels so as to leave the space between the side bars and the axles free and clear.

Spring posts 11 may pass through the springs 7 in the usual way and be tied together below in any of the ways known to the art.

I have thus shown a truck operative in every particular for the purpose of supporting the car body, but do not limit myself to such construction, as for the purpose of my present invention the simplest form of truck can be used, and instead of the upper chord being formed of beams united as shown a continuous metallic upper chord can be used.

The side bearings comprising plates 12 having ears 13 are secured to the side bars of the chord by the bolts 14 or in any other desired way, and have formed thereon two segmental ridges 15, 16 which form between them a channel 17 also segmental in form. These plates are termed the side bearings as they are the truck members, the car members being termed the rub plates, which are shown at 18, Fig. 4, secured to one of the side sills 19 of the car, the rub plates 18 being substantially similar to the side bearings 12 with the exception that they have a segmental rib 20 formed thereon which lies within the segmental channel 17 of the side bearings.

Both the side bearings and the rub plates lie or are disposed away from the pivotal center of the truck, that is to say, they do not form a mechanical pivotal center, but define the point in combination with the drawing devices hereinafter to be described about which the car and truck radiate in relation one to the other.

I do not propose to use the side bearings and the side rub plates for the purpose of uniting the truck and car together to form devices for drawing either the car or truck, as it has been found that should this form of device be relied upon solely for this purpose the segmental ribs 20 would bind in the segmental channel 17 and thus increase the friction of the movements of the car and truck. I, therefore, provide drawing devices at both ends of the truck formed in substantially the same way, the drawing effort being centered in such devices and removed from the side bearings and rub plates, so that the strain due to the moving of the car or truck will be taken upon the drawing devices and not upon the side bearings and rub plates. Thus the weight of the car will be taken on the side bearings, which will act merely as such, the drawing effort being concentrated solely upon the drawing devices.

I do not limit myself to the construction of the side bearings and rub plates, as shown, as they may be flat and act simply as bearings, the end bearings and rub plates being relied on to provide pivotal devices for the car and truck as well as to draw the same, and this can be done without departing from the spirit of my invention. I, however, prefer to retain them, and they are consequently shown and described as a part of the pivotal connections.

The ridges 15 and 16 and rib 20 act to keep the car from moving laterally on the truck, and, as before stated, are not to act as drawing devices, as it is proposed to so relation the connection between the car and the truck that the rib 20 will only have friction between the ridges 15 and 16 due to a movement of the car upon the truck about the pivotal center, and not in the line of draft.

The drawing devices are constructed as follows: Castings 21 (similar in construction to the side bearings 12) having ears 22 through which pass bolts 24 securing the casting upon the cross bars of the upper chord, each of the castings having segmental ribs 25, 26, the rib 26 having a lip 27 segmental in form, both ribs forming a segmental channel 27<sup>a</sup>. To the cross sill 27<sup>b</sup> of the car is secured a plate 28 having a segmental rib 29 adapted to lie and work in the channel 27<sup>a</sup> of the casting 21. It is not necessary that the lower surface of the casting 21 bear on the ribs 25, 26, as the end castings are not used for supporting the weight of the car but act simply as drawing devices. The casting 21 secured to the truck, to wit, the cross bar 10 of the upper chord, I shall hereinafter call the truck draw plate, and the casting 28 the car draw plate, and when referring to the combined car and truck devices shall term them the draw heads.

For the purpose of preventing the car being lifted from the truck I provide a plate 30 which is secured to the cross sill 27<sup>b</sup> by the bolt 31, which plate has a segmental lip 32 which engages and lies beneath the lip 27 on the rib 26 of the truck draw plate, as shown in Fig. 1. The lip 32 is segmental in form as is also the inner surface of the casting 21 as shown in dotted lines in Fig. 2, so that should that casting break, or the rib 29 of the car draw plate break, the plate 30, which I call the stay plate, will prevent the disunion of the car and truck. The stay plate can be formed integral with the car draw plate if desired, although I prefer to use them separately as shown. The inner surface of the truck draw plate, under the lip 27, is segmental in form for engagement with the lip 22, should the parts break as just before set forth.

From the foregoing it will be seen that I provide devices for pivotally securing the truck and car together, and additional devices for providing a drawing connection between the car and truck, all of which have a movement in the arc of a circle generated from the pivotal center of the truck, which center is the universal point about which they all move, the disposition of these devices, as shown, leaving the center of the truck or that portion of the same lying between the side frames of the truck and the axles free and unencumbered.

A further part of my invention relates to the mounting of the motor, so that the motor will be in part supported by the car body and in part supported by the truck, and also that facility in mounting the motor or dismantling will be had. This part of my invention includes the support of one or more motors, and the cushions for one or more.

Referring to Fig. 1, let 33, 34 represent two motors of any desirable structure at one end on the axle by the strap connections 35, 36, which connection is usually made so that the motor can be vibrated upon the axle when desired, the motor being geared to the axle in any of the well known ways. Each of the motors is provided with nose pieces 37, 38 through which are formed apertures 39, 40. From one of the cross sills 41 of the car depends a hanger bar 42 supported upon the sill in any suitable way, say by the nut and plate 43, the hanger bar or pendant passing through an aperture in the cross sill. This pendant supports the free end or noses of the motor. This method of support applies as well to two motors as to one, except that when two are so supported the disposition of the noses as shown gives a good support for the free end of the motor.

The motor or motors are cushioned as follows: The pendant passes through the apertures 39, 40 in the noses, which aperture is preferably larger than the diameter of the pendant so as to permit of a movement of the motor or motors up and down thereon, and between the noses of the two motors and surrounding the pendant is interposed a rubber cushion or block 44, and above the nose 37 and below the nose 38 and surrounding the pendant lie coil springs 45, 46 secured in place by the nuts and washers 47, 48. When but one motor is supported the springs 46 would lie above and below the nose thereof; and when two are supported from one pendant, as in Fig. 1, the cushion 44 may be dispensed with and the noses lie face to face as shown in that figure. This arrangement permits of the use of either one or two motors, and allows for the radiation of the car upon the truck; a movement in the arc of a circle of either the car or one or both of the motors; and a play of the car springs up and down, without transmitting a corresponding movement to the motor.

I do not limit myself to the combination of the method of uniting the car and truck, and the particular form of motor support shown herein, as that part of my invention has many advantages, which can be availed of with many forms of pivotal union.

Another form of motor in use at the present time which could be advantageously carried upon a truck wherein the union is made in accordance with my present invention is illustrated in Fig. 5, in which a rectangular frame 49 is journaled on the axles by the boxes 50, and between the side members of which frame extend cross pieces 51, in which are bearings 52 for the countershaft 53 of the motor 54, the axles being provided with bevel gears 55 which mesh with miter pinions 56 on the countershaft, the countershaft carrying a reducing gear 57 meshing with the pinion 58 on the armature shaft, the motor being supported on wooden blocks 59 strapped to the side bars of the motor frame. I lay no claim to this method of supporting the motor. In this case it will be seen that access to the motor is not interfered with by reason of a cross bolster, and access to the same can be secured by a trap in the flooring of the car.

Where the motors are supported by the pendant, as shown in the drawings, the same can be dismantled by running the truck or car over a pit and unscrewing the lower nut 48 which will permit either or both of the motors to be swung downward on the axle. Thus it will be seen that the motor is suspended from the car within or at the pivotal center of the truck, and that all truck devices for supporting the free end of the motor are eliminated, this method of support being made possible by the peculiar method of uniting the car and truck.

The cross bars of the upper chord take the place of the usual cross bolster; and the length of the truck, so far as this part of my invention is concerned, is only limited by the length of the motor, through which a short wheel base can be obtained.

It may be found advantageous, in some classes of trucks, to eliminate one of the end draw heads, in which case the side bearings would act to pivotally unite the car and truck, and the retained draw head to form a drawing connection; and this can be done without departing from the spirit of my invention.

Having described my invention, I claim—

1. The combination of a truck and superposed car, and draw heads secured alike to the car and truck at each end of the truck, which draw heads permit a radial movement of the car and truck in relation to each other, and side bearings and side rub plates on the car and truck, the side bearings being secured to the side members of the truck, the drawhead and bearing and rub plates being located outside of the wheel base substantially as described.

2. A truck having a top or upper chord, and a superposed car body supported upon the truck by devices which permit of the swiveling movement of the car and truck in relation to each other, said devices being located on one or both ends outside of the wheel base, and on the sides of the truck outside of the wheel gage, substantially as described.

3. The combination of a car and truck, with side bearings on the truck adapted to take the weight of the superposed car, and drawing devices on the ends of the truck, both the side bearing and drawing devices permitting of a movement of the car on the truck in the arc of a circle, and means connected with the drawing devices to prevent disconnection of the parts substantially as described.

4. The combination in a truck, of a motor supported at one end upon the truck or one of its axles, the other end of the motor being supported by means separate from and independent of the truck or its framing, said means permitting the truck and motor to have a swiveling movement relatively to said support without imparting a like movement to the support, substantially as described.

5. In a truck, the combination of a motor supported at one end upon the truck or one of its axles, the other end being supported by means independent of the truck or its framing, said means being fixed in relation to the motor or truck, said means being located at a point about which the truck is adapted to swivel substantially as described.

6. The combination in a truck, of a motor supported at one end upon the truck or one of its axles, a superposed car body, and means for supporting the free end of the motor depending from the car body, which means permit of the free end of the motor being supported from a fixed point, said fixed point being located at the pivotal point between the car and truck and which remains unaffected by the swiveling movement of the car on the truck, substantially as described.

7. The combination with the truck and car, of the motors sleeved at their outer ends upon the truck axles, a pendant secured to the car body and passing through the free ends of both motors, elastic cushions above and below such free ends, and an interposed cushion between the free ends of both motors, substantially as described.

Signed at Philadelphia, in the county of Philadelphia and State of Pennsylvania, this 22d day of March, 1893.

JOHN A. BRILL.

Witnesses:
HENRY C. ESLING,
JNO. T. DUNLOP.